INVENTOR.
WILLIAM FELTEN
BY John W. Michael
ATTORNEY

July 19, 1966 W. FELTEN 3,261,315
METHOD OF PRODUCING SHELLS OF COMPLEX CONFIGURATION
Filed Sept. 17, 1963 3 Sheets-Sheet 2
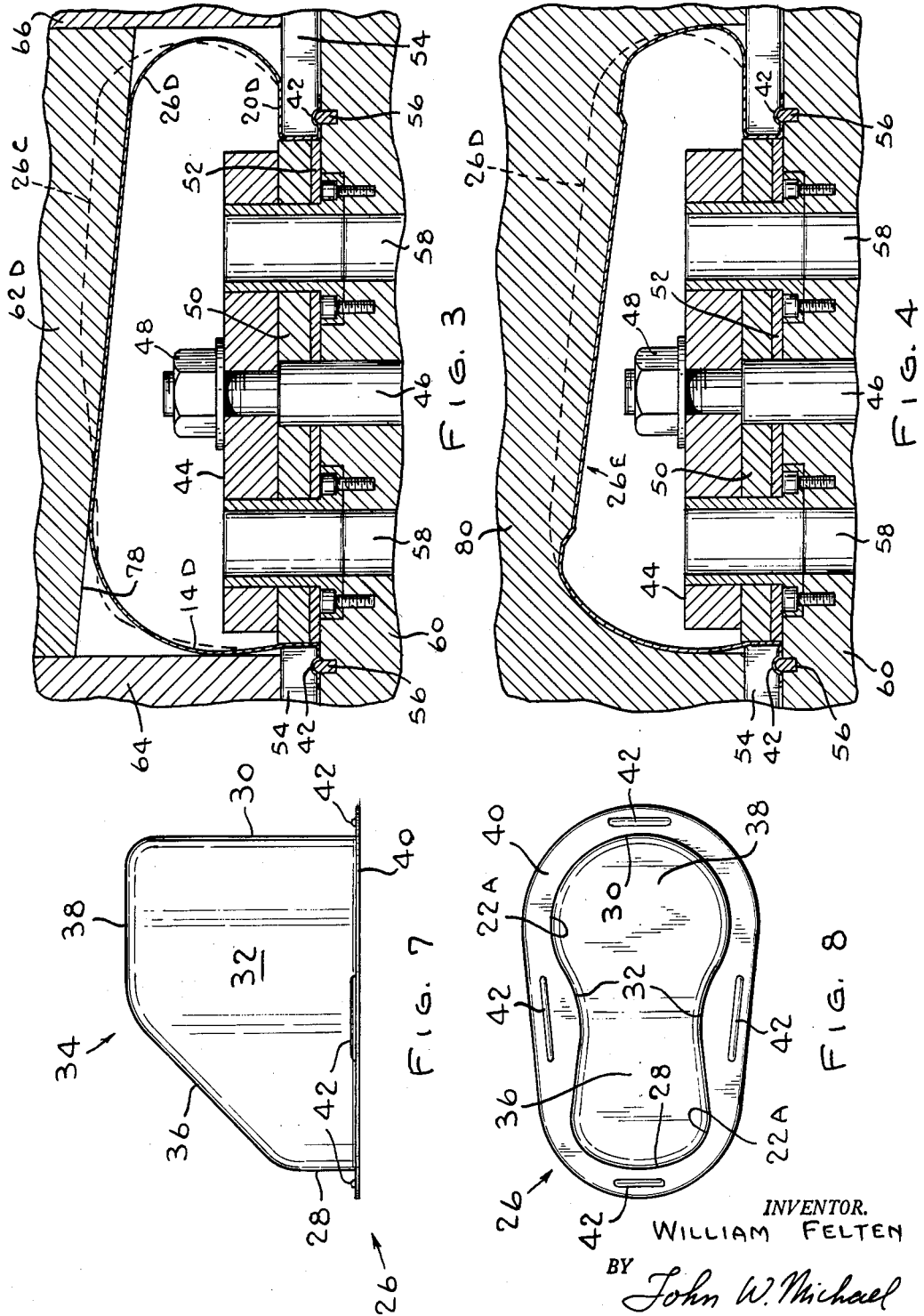
INVENTOR.
WILLIAM FELTEN
BY John W. Michael
ATTORNEY July 19, 1966 W. FELTEN 3,261,315
METHOD OF PRODUCING SHELLS OF COMPLEX CONFIGURATION
Filed Sept. 17, 1963 3 Sheets-Sheet 3
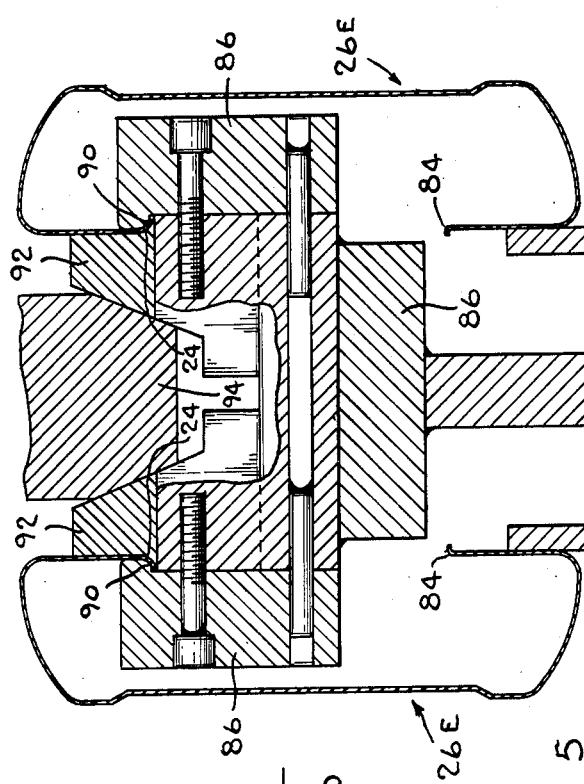
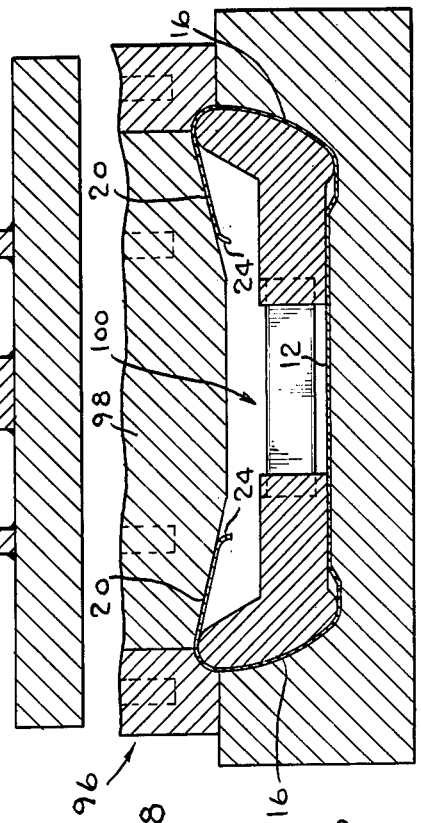
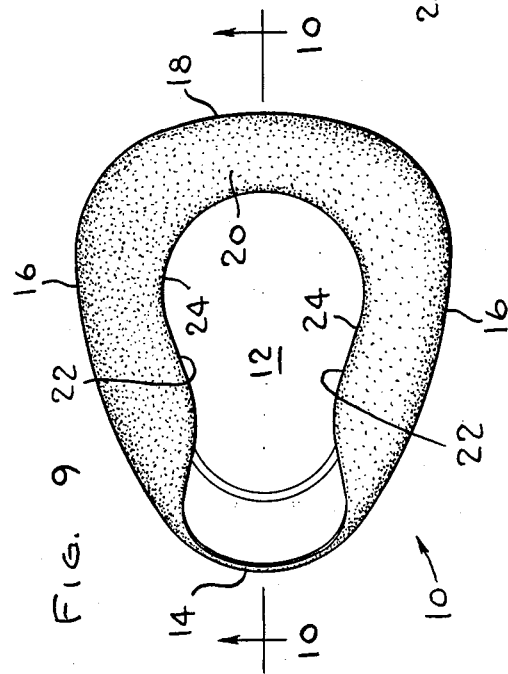
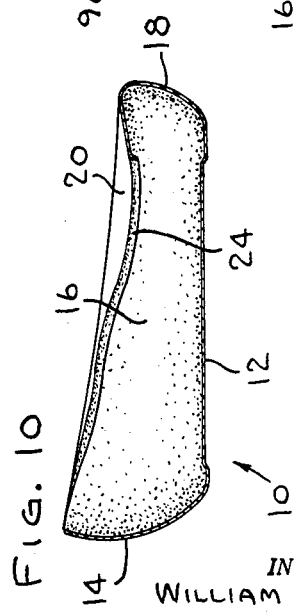
INVENTOR.
WILLIAM FELTEN
BY John W. Michael
ATTORNEY

United States Patent Office 3,261,315
Patented July 19, 1966

3,261,315
METHOD OF PRODUCING SHELLS OF COMPLEX CONFIGURATION
William Felten, 2218 S. 14th St., Sheboygan, Wis.
Filed Sept. 17, 1963, Ser. No. 309,447
9 Claims. (Cl. 113—120)

This invention pertains to a method of manufacturing a steel shell having an opening which is defined by the edge of one of the side walls of the shell and by the edge of an inwardly bent flange which is integral with the other three side walls of the shell and, more particularly, to the method of producing a bedpan which is manufactured from a single blanked piece of stainless steel or other corrosion resistant material.

Bedpans and articles having a comparable shape are generally considered fairly difficult to fabricate. The difficulty primarily lies in the complex curved cross section, both in the top and side cross sectional views, and in the absence of symmetry around the transverse axis. Also, the front end of the bedpan has to be of greater height than the back end thereof. For these reasons, bedpans and similar articles known in the prior art have been manufactured by either stamping or drawing separate top and bottom half sections (the former including the flanged portion) and thereafter joining the half sections by a circumferential seam weld in the assembly of the article. In addition to the cost considerations in this type of manufacture, the circumferential weld is a drawback in the bedpan because the metal of the weld and of the area immediately next to the weld is more susceptible to corrosion than the material of the bedpan.

The principal object of this invention is to eliminate the heretofore known two-piece welded construction in articles of this type.

To attain this object, I draw a blanked shape to form a shell having an opening generally of equal size to the opening of the bedpan to be produced and having a front wall substantially shorter than its back wall and a bottom wall slanting toward the back wall to thereby give more depth to the shell at its back than at its front end. Thereafter I apply internal and external pressure to the shell to work the material of the side and end walls of the shell in a direction downwardly toward the opening of the shell and backwardly away from the front wall and to bulge the side and end walls outwardly. Further, I provide means for limiting the bulging of the front and end walls by means which will bend a portion of the side and end walls inwardly to form the desired flange. During the bulging operation, I limit the extent of lateral bulging of the front wall of the shell, yet permit the front wall and part of the bottom wall to bulge upwardly a predetermined amount above the height of the bulged back wall. Thus, in this process I have reversed the height dimensions of the front and back walls and have provided the required flanges.

Other objects and advantages will be pointed out in, or be apparent from, the specification and claims, as will obvious modifications of the single embodiment shown in the drawings, in which:

FIG. 3 is a view similar to that in FIG. 2 showing the shell after the third bulging step with a superimposed view in dotted lines of the shell as it appears after the second bulging step;

FIG. 4 is a view similar to FIG. 3 showing the fourth bulging step;

FIG. 5 is a fragmentary cross sectional view of the dies employed in rounding the edges around the bedpan's opening;

FIG. 6 is a cross sectional view of the dies employed in bending the flanges of the bedpan;

FIG. 7 is a side view of the drawn shell prior to the first bulging step;

FIG. 8 is the bottom plan view thereof;

FIG. 9 is the top view of the bedpan manufactured pursuant to the present invention; and FIG. 10 is the cross sectional view taken on line 10—10 of FIG. 9.

Figure 1:
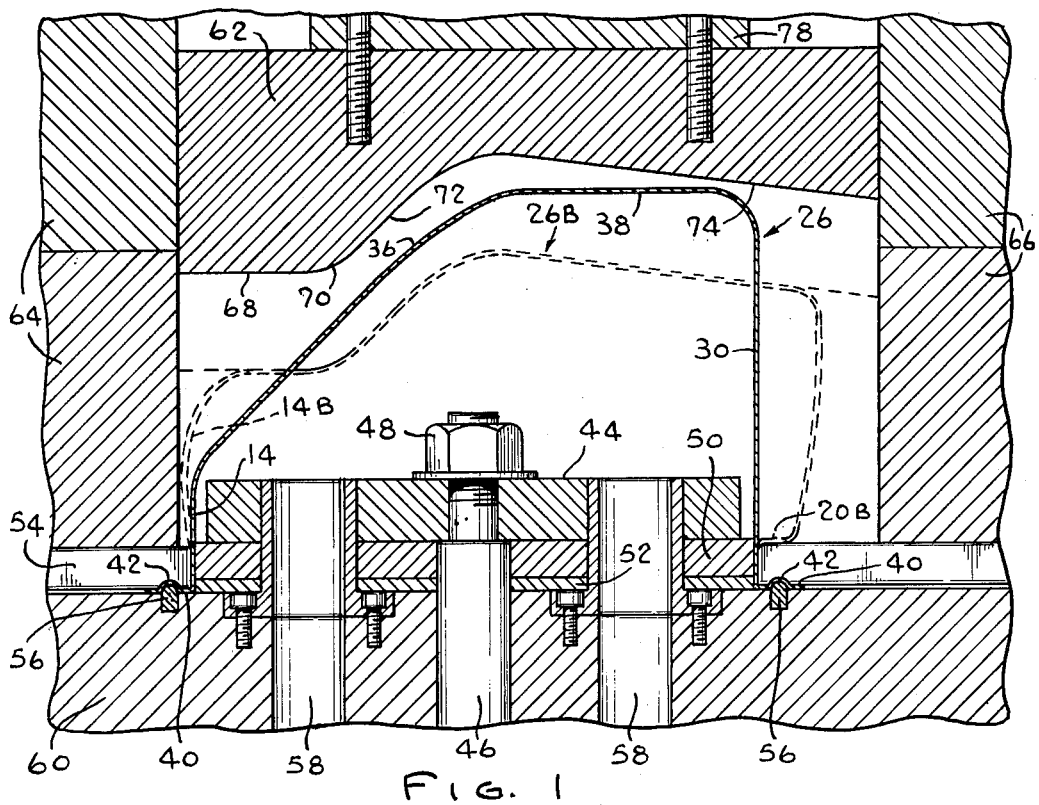
FIG. 1 is a fragmentary cross sectional view of the dies employed in the first bulging step in the manufacture of the bedpan embodying the present invention, a cross sectional view of the drawn shell before the first bulging step, and a cross sectional view of the shell in dotted lines illustrating its shape after the first bulging step.

Referring to the drawings, the bedpan 10 shown in FIGS. 9 and 10 is, in essence, a stainless steel shell formed from a single flat piece of light gauge (17 or 18 gauge) stock. The shell is of a homogeneous or one-piece construction which eliminates the heretofore required circumferential seam weld and the corrosion problem associated therewith.

The bedpan has a bottom section 12 and slightly outwardly divergent and curved (in the vertical plane) front, side, and back walls 14, 16, and 18 respectively. The front wall 14 is narrower yet higher than the back wall 18, and, therefore, the side walls diverge outwardly (in the horizontal plane) and slope downwardly toward the back of the bedpan. An inwardly curved and slightly downwardly sloping flange 20 is integral with the side and back walls and defines with the front wall an aperture 22 for the bedpan. The edge of the flange is rounded to form a smooth downwardly curved lip 24.

The manufacture of the bedpan can be divided into three phases: drawing, bulging, and final forming. The essence of the invention lies in the bulging phase.

The drawing phase comprises the blanking of a flat piece from stainless steel stock and the drawing of the same to the shape of the shell 26 illustrated in FIGS. 7 and 8. The particular shape of the blank and the intermediate shapes to which the blank is drawn are not illustrated since the fabrication of the shell 26 is thought to be well within the skills of one versed in the stainless steel fabricating art. The aperture 22A of the shell is of the same size and shape as the aperture 22 of the bedpan 10. The walls of the shell extend substantially perpendicular to the plane of the aperture 22A and can be classified as a front wall 28, a back wall 30 of substantially greater height than the wall 28 and connected thereto by side and bottom walls 32 and 34. The latter has an inclined portion 36 and a portion 38 which is generally parallel to the plane of the aperture 22A. The shell is provided with a rim 40 having grooves 42 by means of which the shell is located and gripped throughout the bulging phase of the manufacturing process.

The bulging phase, in essence, comprises the forming of the flanges 20 on the three sides of the bedpan (FIG. 9) from part of the stock of side walls 32 and 30 of the shell 26.

The shell 26 is inserted into bulging dies as shown in FIG. 1 and is positioned over a die plate 44 which is substantially of the same shape, but slightly smaller, than opening 22A of the shell and which can be pressed downwardly by means of pin 46 and nut 48 to thereby press die plates 50 against a seal 52 and in this manner assure a pressure tight closure of the opening 22A. The rim 40 is engaged on one side by die plates 54 to thereby press beads 56 into the groove 42 and thus assure proper location and gripping of the shell. The beads and grooves prevent the metal from being pulled out from the position between the plates 54 and die block 60 as well as provide an additional metal-to-metal seal for the shell. Two oil ducts 58 are provided in the lower die block 60 and communicate with the sealed off cavity of the shell. A floating punch 62 is provided which is guided by die blocks 64 which are located very close to the front wall 28 of the shell, and die blocks 66 located a substantial distance from the back wall 30.

After the shell has been properly positioned and sealed as shown in FIG. 1, the shell is subjected to internal pressure by means of high pressure oil or other suitable fluid supplied to the shell through ducts 58. The internal pressure built up is just under that required to deform or bulge the shell 26. This pressure, of course, depends upon the particular gauge of material used. With an 18 gauge material the pressure is in the neighborhood of 2,000 pounds per square inch. After the internal pressure build up, the punch 62 is moved between the solid lines position and the dotted lines position shown in FIG. 1. The particular shape of the floating punch 62 is extremely important in attaining the desired shape of the shell 26 shown in dotted lines in FIG. 1. The punch 62 has a relatively short horizontally extending portion 68 which forms a rounded corner 70 with an upwardly inclined portion 72, and a somewhat downwardly sloped portion 74. Although the die is only shown in cross section, the described contour of the die is uniform throughout the die's width which is equal to at least the width of the shell after it has been bulged in this step of the bulging operation. As the punch is moved downwardly, the surface 74 engages the corner between back wall 30 and bottom wall portion 38; because of the internal pressure, the back wall 30 starts bulging outwardly; shortly thereafter the slanted portion 72 engages the back wall portion 36, thereby working the metal toward the back of the shell and permitting increased bulging at the back and sides of the shell. By virtue of the die contour, most of the force applied by the die is utilized in reducing the height of the shell 26, and, in combination with the internal hydraulic pressure, bulging the side walls 32 and 30 outwardly to cause their ends next to the die plates to bend and to define a small flange 20B. The horizontally extending portion 68 does not substantially deform the shell but is principally utilized to limit the outward and upward bulging of the shell in its front end. In the same manner, the die block 64 limits the lateral bulging in this area. It is of note that the bulging in this area forms a front wall 14B which is of increased height over the height of wall 28 of the shell 26. Thus it can be said that the contour of the punch works the material toward the back and sides of the shell and permits the internal pressure to freely bulge the material in these areas, yet only serves to limit the bulging in the front portion of the shell. Once the shell has been fabricated to the contour 26B, the internal hydraulic pressure is relieved and the punch 62 is lifted upwardly.

Figure 2:
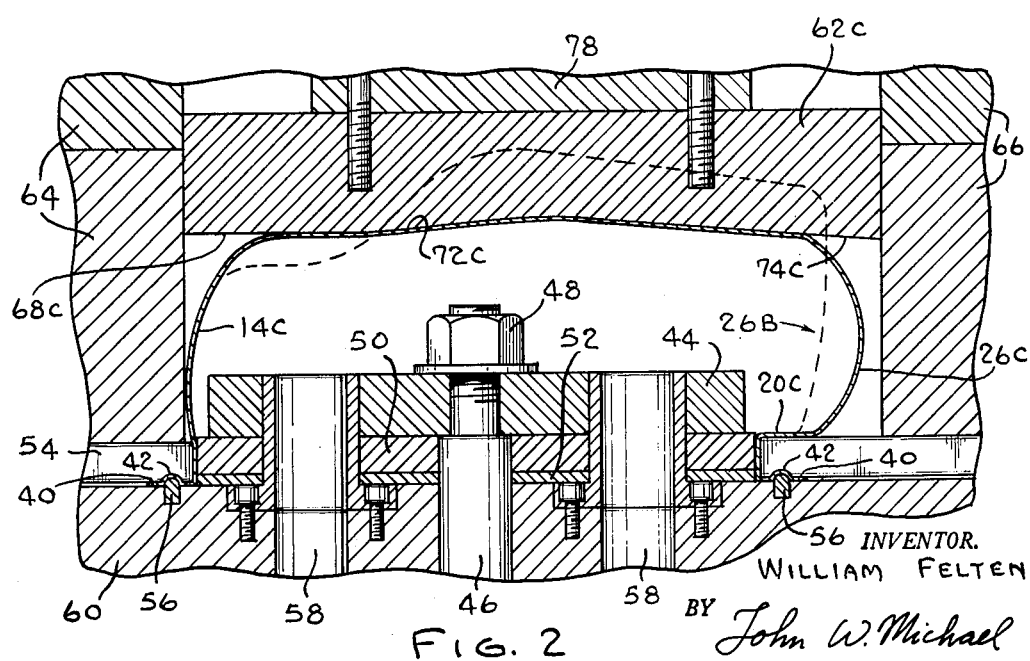
FIG. 2 is a fragmentary view of the dies similar to that shown in FIG. 1 with a cross sectional view of the shell after the second bulging operation and with a superimposed view in dotted lines of the shell prior to the bulging step.

The second step of the bulging phase is shown in FIG. 2 in which the shell 26B is illustrated in dotted lines and in which a punch 62C has been substituted for the punch 62. The punch 62C is shown in its lowermost position at which the shell 26B has been bulged out to the contour of the shell 26C. Between these bulging operations the shell has been annealed and clamped in the same position and the new punch has been attached to ram 78. The contour of the punch 63C has a generally horizontal portion 68C which gradually turns into a slightly upwardly inclined portion 72C, and a gradually downwardly sloped portion 74C. The internal pressure is applied and the punch actuation occurs in the same sequence in this phase of the operation as in the first step described in reference to FIG. 1. When comparing the contours of shell 26B (before step 2) and 26C (after step 2) and the position of the punch 62C in respect to them, it is apparent that the die portion 72C and 74C have further reduced the height of the side walls and end wall of the shell and formed a shell with a flange 20C of greater width than 20B. Also, the horizontal punch portion 68C has not deformed the metal in the front section of the shell, but has again been merely utilized to limit the upward bulging of this section of the shell in response to the internal hydraulic pressure. Thus the shell 26C formed in this step has a front wall 14C of increased height over the front wall 14B of shell 20B.

The third bulging step is shown in FIG. 3 in which the shell 26C is shown in dotted lines. Between steps two and three the shell is annealed and the punch 62D has been substituted for 62C. The sequence of internal pressure application and punch actuation is identical to that of the previous steps. The punch 62D is shown in its depressed position at which point the shell 26C has been bulged out to the contour of shell 26D. The face 79 of the punch is straight and sloping downwardly toward the back of the shell, thereby working the metal on the sides and back of the shell to further increase the flange to the size shown at 20D and to further reduce the height of the back portion of the shell. Also, the front wall 14D has been permitted to be further rounded out. It is of note that at this point the height of the front wall becomes greater than the height of the back wall.

Although the illustrated method is shown as a three-step operation to attain the shell 26D, it is possible to obtain the shape of shell 26D by merely utilizing the dies shown in FIGS. 1 and 3 and eliminating those of FIG. 2. To eliminate the middle step would require either the reduction of the thickness of the drawn shell 26 and thus a corresponding reduction in the wall thickness of the final product (from an approximate thickness of 0.026 inch to a thickness of 0.022 inch), or the use of a more ductile material than the stainless steel materials generally used today.

The final bulging step is shown in FIG. 4, in which again the shell 26D is shown in dotted lines and the shell 26E is shown as formed in this step. The shell has again been annealed. The punch 62D and the die blocks 64 and 66 have been removed and a final forming die 80 has been substituted therefor. This die substantially conforms to the contours of the bedpan 10. In this respect, it is of note that whereas the punches used in the previous steps were of a uniform cross sectional contour and whereas the die blocks 64 and 66 did not restrict the bulging of the sides and back portions of the shell, the die 80 limits the bulging on these sides as well as on the front side. Again the sequence of initial internal pressure application and the actuation of the punch is the same as in the previous steps. When comparing the shells 26D and 26E, it is again apparent that the die has further worked to increase the flange dimensions and has permitted the internal pressure to slightly increase the height dimension of the front body portion of the shell.

After the fourth bulging step, the shell 26E is removed from the bulging dies. Thereafter the rim 40 is trimmed off in a conventional manner leaving only a small upwardly extending ridge 84 (FIG. 5). After the trimming, the flanges are inserted in the fixture shown in FIG. 5 to form the ridges 84 at the ends of the flanges to the downwardly curved lip 24. For this purpose two identical shells 26E are clamped by die blocks 86 to a base 88. The blocks 86 have a rounded shoulder 90 which conforms to the desired radius 24 and which extends around part of the contour of the flanges 20E of the shell. Die blocks 92 having a complementary contour to the shoulder 90 are moved against the die blocks 86 by a ram 94 to thereby form the lip 24. Since the bedpan 10 is symmetrical around its longitudinal axis, the shells 26E shown in FIG. 5 are inverted to round off the flanges on the other side of the bedpan. After this operation, the shell is inserted in a forming die 96 which employs a ram 98 to bend the flanges to the desired inwardly sloping position. For this purpose the collapsible die insert 100 is positioned within the bedpan.

Although but a single embodiment of the present invention has been illustrated and described, it will be apparent to those skilled in the art that various changes and modifications may be made therein without departing from the spirit of the invention or from the scope of the appended claims.

I claim:

1. The method of manufacturing a steel shell having an opening which is defined by the edge of one side wall of the shell and by an inwardly bent flange which is integral with the other three side walls of the shell, comprising the steps of, drawing a blanked shape to a form having an opening generally of equal size to the opening of the shell to be produced by this method, and having a front wall substantially shorter than the back wall, said front and back walls being integral with a bottom wall and two side walls to define a drawn shell having substantially greater depth at its back than at its front end, securing said drawn shell in a die, applying hydraulic pressure to the inside of said drawn shell, applying external pressure to the bottom wall of said drawn shell by means of a punch having a slanted surface to thereby press said end and side walls downwardly against said die and in a direction away from said front wall, and to thereby cause said back and side walls of said drawn shell to bulge outwardly and cause part of said walls to be pressed against said die and to be bent to form the flanges on the three sides of said drawn shell, and permitting the front wall and part of the bottom wall at the front end of said drawn shell to bulge a predetermined amount upwardly yet limiting the lateral bulging of the front wall of said drawn shell to thereby prevent the formation of a flange at the front of said drawn shell, and relieving the internal pressure and removing the punch to thereby permit the removal of the formed shell from said die.

2. A method according to claim 1 wherein said punch has a generally horizontal surface overlying the front end of said drawn shell, an upwardly inclined surface overlying the center portion of said drawn shell, and a downwardly sloped surface overlying the back portion of said shell, the position of said three surfaces being indicated in reference to the plane of the opening of said shell, said generally horizontal surface limiting the upward bulging of said front wall and of the bottom wall at the front end of said drawn shell.

3. A method according to claim 1 wherein the bottom wall of said drawn shell has a slanted section extending from said front wall, and a bottom section between said slanted section and said back wall, said bottom section being generally parallel to the opening of said drawn shell.

4. A method according to claim 3 wherein said slanted surface of said punch engages said slanted surface of said drawn shell as said external pressure is applied by said punch.

5. The method of manufacturing a bedpan having a bottom wall, a front wall, two side and one end walls integral with an inwardly bent flange, the front wall the flange defining the opening of the bedpan, and the back wall being of a smaller height than the front wall, comprising the steps of:

providing a drawn shell having an opening of the general contour of the opening of the bedpan, said shell being of less depth at its front end than at its back end, clamping the edges of said shell to a die, applying internal hydraulic pressure to said shell, and simultaneously pressing the back end downwardly toward said die and away from the front end of said shell thereby bulging the side walls and back wall of said shell outwardly so that a part of each of said three walls is bent inwardly and against said die to form the flange, permitting the front end of said shell to be bulged upwardly by said internal pressure yet limiting the bulging at a point at which said front wall is higher than the back wall, and relieving said external and internal pressures to permit removal of the formed shell from said die.

6. The method of manufacturing a bedpan having a bottom wall, a front wall, two side and one end walls integral with an inwardly bent flange, the front wall and the flange defining the opening of the bedpan, and the back wall being of a smaller height than the front wall, comprising the steps of:

providing a drawn shell having an opening of the general contour of the opening of the bedpan, said shell being of less depth at its front end than at its back end, clamping the edges of said shell to a die, applying internal hydraulic pressure to said shell and simultaneously applying external pressure to said shell by a punch having an upwardly sloped surface overlying an area located between the front and back walls of said shell and operable to exert a downward and backward force to said bottom wall of said shell, and said punch also having a downwardly sloped surface overlying an area next to the back wall of said shell, said surfaces cooperating with said internal pressure to decrease the height of the back end of said shell and to cause said side and end walls to bulge outwardly and form an inwardly bent flange against said die, thereafter again applying internal hydraulic pressure to said shell and simultaneously applying external pressure to said bottom wall of said shell by a punch having an upwardly sloping surface from the back to the front end of said shell to thereby further depress the back end of said shell and increase the length of said flange and to permit the front end of said shell to bulge upwardly against said punch surface to thereby cause said front wall of said shell to become of greater height than said back wall, and relieving said internal and external pressures and removing said formed shell from said die.

7. The method according to claim 6 including the additional step of applying internal hydraulic pressure and external generally downward pressure between the first and second applications of internal and external pressure.

8. The method according to claim 6 wherein said shell is annealed after the first application of external and internal pressure.

9. The method according to claim 7 wherein said shell is annealed between the first and second applications of external and internal pressure and between the second and third applications of external and internal pressure.

References Cited by the Examiner

UNITED STATES PATENTS

| | | | |
|---|---|---|---|
| 2,138,199 | 11/1938 | Wendel | 72—58 |
| 2,138,268 | 11/1938 | Dake | 72—58 |
| 2,592,867 | 4/1952 | Cuq | 72—58 |
| 2,743,691 | 5/1956 | Cuq | 72—58 |

CHARLES W. LANHAM, *Primary Examiner.*

R. J. HERBST, *Assistant Examiner.*